Jan. 6, 1953  R. E. BEEGLE  2,624,299
EAVES TROUGH
Filed Feb. 10, 1949
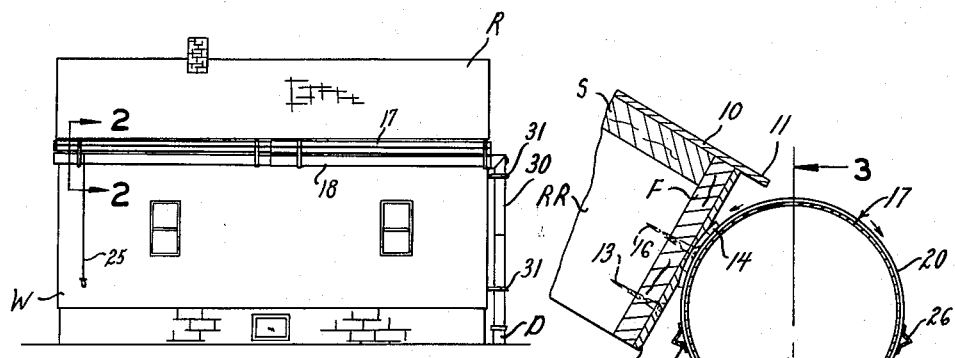
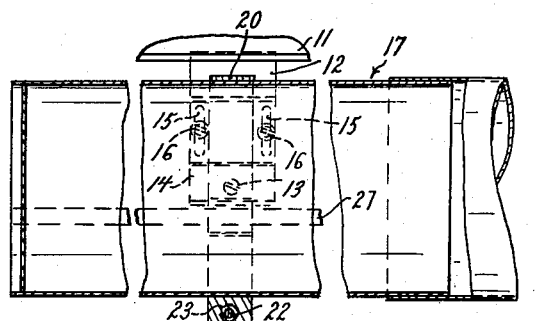
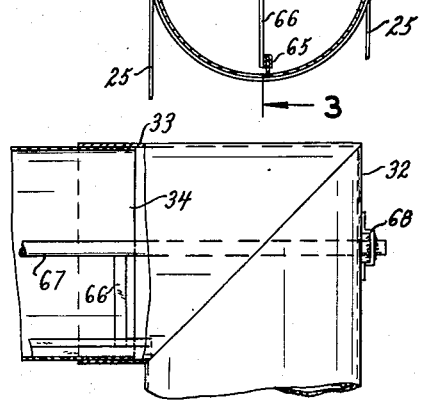
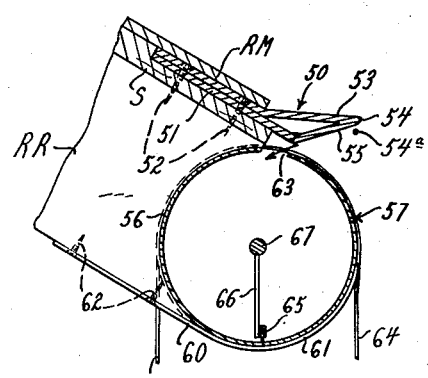
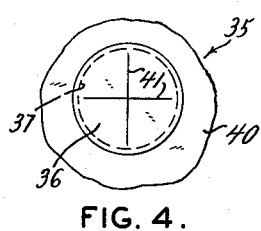
INVENTOR
RAYMOND E. BEEGLE
BY
ATTORNEY Patented Jan. 6, 1953

2,624,299

UNITED STATES PATENT OFFICE 2,624,299

EAVES TROUGH

Raymond E. Beegle, East St. Louis, Ill.

Application February 10, 1949, Serial No. 75,600

12 Claims. (Cl. 108—28)

This invention relates to improvements in eaves troughs, and more particularly to a novel assembly of eaves trough embodying especial provisions conducive to a separation of the water and the solids entrained thereby, the improvements being further importantly characterized by provisions enabling a periodical cleansing of any accumulated solids, as by a dumping actuation of the trough.

In personal experience with prevailing types of eaves trough assemblies, there have long been recognized, but without satisfactory solution, the difficulties of accumulation of leaves, carbon particles and other solid matters precipitated from the air upon the roof, but without any means for removing such solids from the eaves trough other than by a laborious manual clearance thereof from the trough by an operator working at or near eaves level. It is accordingly a major and principal objective of the present improvements, to obviate or at least alleviate the labor and hazards of the clearing operations heretofore necessary.

A further and important objective realized in the present improvements, involves an improved form of eaves trough which is journalled for at least partial rotation about its own axis, thereby encouraging and facilitating frequent clearing of solids from the trough.

Yet another object of the invention is realized in an improved design of an eaves trough assembly of such nature as to tend to divide or separate entrained solids and the water by which they are initially removed from the roof, and at the same time to divert such solids from the trough, thereby minimizing an accumulation in and obstruction of the trough.

A still further and highly useful feature of the present improvements is objectively realized in combination with an eaves trough of dumping type, and the combination therewith of a remote-actuation agency such that the trough may be actuated for dumping purposes, by an operator at or near ground level, or at least at a safe distance below the eaves trough.

Further valuable features of the improvements objectively include, in an assembly of the type referred to, provisions for internally wiping and dislodging, as for dumping purposes, the adhering solid sediment usually collecting in conduits of this kind; a novel closure which is preferably of a self closing type, and which is of such nature as to permit the introduction for flushing purposes, of a hose nozzle or the like, and which will by inherent resilience, resume a closed position upon withdrawal of the hose or like flushing agency.

The foregoing and numerous other objects will more clearly appear from the following detailed description of a preferred embodiment of the invention and a minor modification thereof, particularly when the description is considered in connection with the accompanying drawing, in which:

Fig. 1 is an elevational view of a building such as a residence structure showing the roof, together with the eaves and an eaves trough assembly constructed and erected according to present improvements;

Fig. 2 is a transverse sectional view through an eaves trough assembly, particularly as taken along line 2—2 of Fig. 1, and being considerably enlarged to reveal certain structural details;

Fig. 3 is a view which is sectional in nature, and taken along a vertical axial plane through the eaves trough assembly of Figs. 1 and 2, more particularly as viewed along line 3—3 of Fig. 2;

Fig. 4 is fragmentary end elevational view of a closed end of the trough assembly of Figs. 2 and 3, and showing particularly a special closure element in an end cap of the trough, and Fig. 5 is a transverse sectional view of a somewhat modified form of eaves trough assembly.

Referring now by characters of reference to the drawing, there is shown by Fig. 1 a preferred location and general manner of installation of an eaves trough assembly such as is shown more in detail by Fig. 2. In Fig. 1, the roof is indicated at R, and one of the walls of the house at W. Assuming a more or less conventional construction of roof, the rafter ends RR will project somewhat beyond the wall W, and will be overlain with sheathing S, and the ends of the rafters bridged and faced as by a face-board F.

In Fig. 2 there has been omitted for clearness of illustration the roofing material proper, such as shingles, composition roofing, tile or the like, so that there appears directly overlying the sheathing S a metal fall board 10 characterized by a projecting ledge 11, over which the fall of water from the roof is directed downwardly upon the eaves trough assembly. Secured to the face board F in each of a number of spaced locations along same, is a mounting plate 12. The location of each of the plates 12 is preferably such that they fall in line with the ends of the rafters RR and such that the plate may be mounted as by wood screws 13. Mounted against and backed by each of the plates 12, is an arcuate breast plate 14 which is provided just inwardly of and parallel to its opposite side margins, with slots 15, a pair of which are shown, and through which extend additional wood screws 16, the latter in turn extending through circular apertures therefor in plate 12, thence into or through the face board F and into the end of the adjacent rafter RR.

It will have appeared that in the preferred structure of trough assembly of Figs. 1, 2 and 3, the major elements of the combination consist of a pair of parallel, substantially cylindrical, sheet metal tubes arranged one above the other, or otherwise expressed, in over-and-under relation. The uppermost such tube is generally indicated at 17, and the lowermost tube generally indicated at 18, the latter constituting the eaves trough or liquid conduit.

Anchorage and support for the tubiform elements 17—18 consist of a suitable number of longitudinally spaced journalling hangers each of a substantially figure 8 form, and each comprised of an upper loop 20 for and embracing the cylindrical member 17, and a lower loop 21 extending about the tube 18. These two loops or bight portions 20, 21 may be formed of a flexible, or if desired of a tempered metal strip, and the central portion of each of the journalling hangers reentrantly formed and provided with registering apertures (not shown) for the reception of a clamp screw 22 provided with a nut 23. The formation of the journalling hangers may be such that the starting end of the strip of which each is formed, is apertured to receive the screw 22, thence extends clockwise (Fig. 2) about the tube or cylinder 17, thence through the restricted portion where it is further apertured for the clamp screw, whence the strip extends through an almost fully circular portion, being the lower loop 21, with its finish end apertured for screw 22.

The tension imparted to the lower loop 21 of each hanger may, now obviously, be regulated or varied by the extent to which the screw 22 and nut 23 are threaded up, but the degree of clamping constriction by loop 21 is such that the tube 18 may be readily rotated in journalled relation, within the several loops 21 spaced over its length.

It is important to note that the tube or conduit 18 forming the eaves trough proper is provided, say over an angular extent of 30–35 degrees, with a longitudinal slot 24, which slot provides an opening for access of the fall of water into the tube or trough.

It is clearly preferred to provide a remote manipulation agency of some form so that an operator at ground level may at least partially rotate the eaves trough 18 about its own axis, whereby to bring the slot 24 to a position along the bottom of the trough, as for dumping therefrom all solids which will freely clear the trough. Although any suitable provision in the nature of a mechanical linkage or the like may be employed for the purpose, a simple manipulation agency consists of a cord 25. This is preferably wrapped at least one complete turn about the conduit or trough 18 and may be secured to the tube or trough in any suitable manner so that a pull upon one pass of the cord will serve to bring the conduit 18 to the dumping position aforesaid.

Proceeding further to describe the manner of support and mounting of the trough assembly incident to its erection, the upper loop 20 of each hanger is preferably attached as by welding, to the arcuate breast plate 14. As will now have appeared, since the loop portion 20 is attached to the breast plate, the latter may be adjusted by backing off screws 16 operating in the slots 15, and thus enabling a rocking adjustment of the breast plate upon plate 12 in a manner to enable a minor adjustment in the distance relation between the eaves trough assembly and the ledge 11.

Fig. 2 shows, as a leaf-separator, a sharp rib 26 preferably separate from and welded to the tube 17, and which may be referred to as a fall ledge. This rib, and an identical V-shaped rib 27, are flattened in the regions of the hangers. The function of the one or more ribs arises from the tendency of leaves and trash to follow the curved stream moving downwardly over member 17, into the slot 24, unless the surface tension resulting in cohesion of solids and water, be abruptly broken, as by a relatively sharp ledge or separator of this general nature. The apexed rib 27 will function identically as to leaf-separation, on the building side of the assembly.

A suitable downspout provision is of course desirable for direction of the discharge of water from the eaves trough, say to a drain D (Fig. 1), the downspout being indicated at 30, leading into the drain, and is provided with suitable hangers or attachment straps 31 to position the spout in fixed relation to the building. At the top of the downspout 30 is shown an elbow 32, the angle extension 33 of which is of an internal diameter to receive therein the otherwise open end 34 of the lowermost tube indicated at 18. The end of the slotted tube 18 is not fixedly attached to the elbow extension 33, in view of the fact that it is desirable, as noted, to permit at least partial rotation of this conduit.

An added convenience making for ease in thoroughly cleansing the interior of the trough or tube, consists of a flexible, self closing end plate member best shown by Fig. 4 and indicated at 35. This structure may consist of a circular rubber disc 36 which is peripherally grooved as at 37 (Fig. 3). In assembling the disc 36, the circular end plate 40 of member 18, is provided with a circular aperture of such size that the disc 36 may be pressed into position in the central aperture of member 40 so that the margins of the aperture will engage the groove 37. The rubber or rubber-like element 36, which may be of any suitable flexible composition, one example of which is cured rubber, is provided with a cross-shaped incision 41. It will now have appeared that if it be desired to flush the interior of the trough or tube 18 for removal of adhering solid matter, a hose nozzle N may be pressed through the center portion of the rubber disc 36 with the effect of swinging inwardly one or more of the flaps resulting from the incision. One manner of accomplishing this is indicated by Fig. 3. Upon removal of the nozzle, the flexibility of the inwardly directed portions of member 36 is such that they will resume substantially a sealing relation, and will tend to be brought into a positive sealing position by the outward pressure due to any moderate head of water within the trough.

Although the purposes and objectives of the present improvements are most fully realized in the structure of Figs. 1, 2 and 3, a somewhat simplified and lower cost form is shown by Fig. 5, wherein the rafter ends RR of the roof are bridged and surmounted by the sheathing S, overlain by any suitable roofing material RM, in the region of the eaves of the building. In this arrangement a fall plate or ledge member is generally indicated at 50, and preferably mounted above the flat plate 51, the elements 50 and 51 being secured together and attached to the sheathing S as by wood screws 52. In the example shown, the ledge plate 50 is extended beyond the eaves proper into a substantially horizontal fall plate portion 53 which terminates outwardly in a ledge 54, whence the material of the member 50 is reentrantly bent rearwardly and downwardly to form a portion of substantially V-shaped section, the lowermost part of which is indicated at 55. The extremity of member 55 is preferably brought back into abutting relation to the plate 51 and may be welded thereto in this zone.

In this modified form, the rafter ends may be arcuately recessed as shown, but whether or not so formed, serve by preference to carry an arcuate strip 56 against which bears the tubiform or partly cylindrical conduit constituting the eaves trough proper and designated at 57. The trough 57, slotted at 63, is or may be identical in construction to the element 18 (Figs. 1, 2 and 3) and is journalled in hangers 60, having arcuate bearings 61, and secured to the rafter ends by screws 62. If desired, the slotted conduit 57 may be welded to and supported by the lower margin of member 55, or may be formed integrally with the member 50, without impairment of the leaf-separating function of parts 54—55, such a change sacrificing only the rotational feature. Optionally, the leaf-separating function of this assembly may be enhanced by the addition of an auxiliary interceptor which may consist of a rod, a wire or like element, indicated by location at 54A in Fig. 5, preferably about one-quarter inch below apex or ledge 54 and slightly inwardly of such ledge.

For the purposes of enabling at least a partial rotation of the tube or trough 57, say from ground level, it is provided with a wrapped actuating cord 64, which is or may be identical with the cord 25 heretofore described.

A further added cleaning convenience consists in the provision of a wiping element internally of the conduit or trough, and which is exemplified by an internal squeegee. This assembly includes a downwardly presented, flexible blade 65, supported by spaced arms 66 fixedly attached to a stationary supporting rod 67. The rod 67 will extend from one or both ends of the conduit thus equipped, and is supported externally beyond the ends of the trough by one or more brackets 68 secured to any convenient stationary portion of the building, usually in the eaves region thereof. It will now have appeared that, the wiping blade being held stationary, relative motion between the conduit and the blade occurs through the rotative movement imparted to the conduit member 18 or 57 through actuation of the cord 25 or 64. In case, as is recommended, the axial rod of the squeegee assembly extends endwise beyond both ends of the conduit in which it is utilized, the provision of the flexible closure 35—36 will be omitted.

Although it is felt that the operation of the improved eaves trough assemblies will have become apparent from the detailed description of the elements thereof, it may nevertheless be noted for completeness that, as to Fig. 2, the fall of water with entrained solids will move downwardly over and be delivered by the plate 11 onto the top center part of the uppermost tube 17. The fall of water upon impingement with the member 17, will be divided, and a portion of both the water and solids carried thereby, will move in a counterclockwise direction downwardly over the member 17 where it encounters the ledge or separator 27. Entrained solids such as leaves, twigs and the like have been shown by numerous experiments to be deflected in large proportion by the ledge 27, while the surface tension of the water and its cohesive effect, result in by far the greater part of the stream of water, now without its solids, following the convex surface of member 17, thence proceeding into the slot 24 of the trough 18, whence it is discharged via the downspout. The remainder of the fall of water delivered over the ledge 11 will proceed in a clockwise direction (Fig. 2) over the outside of the cylindrical member 17 where it encounters ledge 26, with results identical to those described, the flow of water thence moving primarily into the slot 24.

With reference to the modified form (Fig. 5), the separating function is effected primarily by the V-shaped element 53, 54, 55, it being noted that in the case of each of the ledges 26, 27 and 54 the ledge or fall element is distinctly laterally offset from a position directly above the water-receiving slot of the tube therebelow. In Fig. 5, inertia effects will tend to impell the solids over the ledge 54 while the greater portion or all of the water will, as described, cling to and follow the back-turned portion 55 through the slot 63 of the conduit 57. It is greatly preferred, in fact essential, that the margin 54 (Fig. 5) and the corresponding edges on members 26 and 27, be of a substantially abrupt or sharp character, and should be formed if folded, of no greater than a one-quarter inch radius, a distinct edge being preferred in this region.

Proceeding now to describe the function of the several cleaning, clearing, and dumping devices, it will be understood that any of these expedients may be embodied in and with either of the forms of assembly disclosed.

In the case of either form of structure, all unadhering solids which may accumulate from time to time in the trough 18 or member 57, may be dumped or unloaded by gravity, merely by actuation of the cord 25 or 64 to bring the slot of the conduit to a bottom position. Unless the trough is very high above ground, a hose stream may be directed upwardly through the slot, with adequate flushing effect. Should this fail completely to dislodge the accumulation, the nozzle end of a hose may be inserted through the flexible closure portion 36 as described, it being noted that this may be done from below while the trough is in dumping position. In such installations as embody the stationary wiping member such as a squeegee, it has been found usually sufficient merely to oscillate the slotted conduit through two half turns to effect a complete wiping action on the interior of the conduit, then bring same to its dumping position through the manipulation of the cord 25 or 64. In extreme cases arising from protracted accumulation, the squeegee action may be augmented by flushing the trough to the extent necessary.

Although the invention has been described by particularized reference to two preferred embodiments, the detail of description should be taken as instructive rather than limiting, inasmuch as numerous variants are possible within the full intended scope of the claims hereunto appended.

I claim as my invention:

1. In an eaves trough assembly, in combination with the sheathing and rafter ends of a roof, a metal plate secured to the outer margin of the sheathing, said plate extended outwardly of the sheathing, and including a V-shaped portion, the outer extremity of which constitutes a relatively sharp water ledge, an eaves trough in the form of a longitudinally slotted tube arranged with its slot uppermost, a plurality of trough hangers supported from the rafter ends and adjacent portions of an eaves structure, and a horizontal interceptor element spaced slightly below and slightly rearwardly of the said water ledge, the said water ledge being located in a distinctly overhanging relation beyond the slot of the tubular eaves trough, whereby to direct the overflow of water-suspended solids beyond the slot of the trough, and tending to direct a flow of water inwardly or rearwardly toward the slot of the trough.

2. An eaves trough assembly consisting of a pair of parallel, substantially cylindrical members arranged in over-and-under relation, means for attaching the assembly to the eaves structure of a building, the lowermost of said cylindrical members being provided with a slot normally located in its uppermost portion, and the uppermost of the cylindrical members located to serve as a divider for a flow of water from the eaves to the lowermost said cylindrical member, and further formed to serve as a deflector for water-entrained solids.

3. The combination and arrangement of elements as recited by claim 2, but further characterized in that the uppermost of the paired cylindrical members is formed to provide along its outer surface, a substantially horizontal rib adapted as a separator for entrained solids from a flow of water moving into the lowermost cylindrical member.

4. An eaves assembly formed of a pair of substantially parallel, substantially cylindrical members, one arranged below the other, and assembled in spaced parallel relation, the lowermost member provided with a longitudinal top slot, a fall member carried above the uppermost cylindrical member and located to deposite a fall of water on the top of the uppermost member which is thus arranged to divide the flow of water thereover, and being arranged to cause a flow of water into the slot of the lowermost member by adhesion of the stream to the sides of the uppermost cylindrical member.

5. The combination and arrangement of elements as recited by claim 4, but further characterized by the addition of a series of journalling hanger elements spaced along the lowermost cylindrical member, and in which said member is movable about its axis for purposes of dumping solids therefrom.

6. The combination and arrangement of elements as recited by claim 4, but further characterized by the addition of a substantially horizontal, longitudinal rib on each of the opposite sides of the uppermost cylindrical member, said ribs serving as deflectors or separators for entrained solids.

7. In an eaves trough assembly, a pair of parallel, spaced, substantially horizontal and substantially cylindrical sheet metal tubes arranged one below the other, the lowermost tube being characterized by a longitudinal water slot in its uppermost portion, a series of spaced hangers each of substantially figure 8 shape, the upper and lower loop of each of which substantially embraces, respectively, the upper and lower cylindrical tubes, a central transverse clamping element between the loops of each of said hangers, an anchoring plate adapted for securement to the sheathing or eaves portion of a building, and provided with an outer extension constituting a water ledge, a second fixed plate portion depending from the water ledge and secured to a face board or rafter ends, a slotted breast plate of curved section secured to the uppermost loop portion of each of the hanger elements, screws extending through the slotted areas of the breast plate, to enable an adjustment of the hangers with respect to the eaves of the building, a pair of ribs of substantially horizontal trend and located on opposite sides of the uppermost cylindrical element, the lowermost cylindrical element being mounted in movable relation within the hangers, whereby the latter serve as journalling elements for said lowermost element, and an actuating cord extending over the lowermost cylindrical element to a point accessible from near ground level, to enable rotation of the last said cylindrical element to a position to enable dumping of its solid content through its slotted region.

8. In an eaves trough assembly, a fall plate adapted to constitute a marginal extension of the roof structure, a reentrant plate extended downwardly and rearwardly of the fall plate, the juncture of said plates being characterized by a relatively sharp separation margin, and a trough element extended along and located substantially fully beneath said plates, and with the top opening of the trough located inwardly beyond said separation margin.

9. In an eaves trough assembly, a fall plate constituting substantially a continuation of the roof surface, a reentrant plate of planar form attached to the fall plate and extended downwardly and inwardly therefrom, there being a sharp separation margin in a zone of juncture of said plates, a trough element supported substantially fully beneath the said plates, and so located with respect to the reentrant plate, that the plane of the latter, when projected, intersects the top opening of the trough.

10. In an eaves trough assembly, a fall plate adapted to constitute a marginal extension of the roof structure, a reentrant plate extended downwardly and rearwardly of the fall plate, the juncture of said plates being characterized by a relatively sharp separation margin, and a trough element extended along and located substantially fully beneath said plates, with the top opening of the trough element located inwardly beyond said separation margin, and a substantially horizontal interceptor member located slightly below and slightly inwardly of said separation margin.

11. In an eaves trough assembly, a trough of incompletely circular transverse section, presenting a water-receiving slot along its upper portion, a fall member or water ledge, of a V-shape in transverse section, the apex portion of which constitutes a substantially abrupt, linear, outermost margin located above and substantially parallel to the trough, said outer margin being laterally displaced outwardly from a position directly above the slot.

12. In an eaves trough assembly, a trough provided with a longitudinal, relatively narrow water-receiving slot along its upper portion, a fall member or water ledge, of a V shape in transverse section, the apex portion of which constitues a substantially abrupt, linear, outermost margin located above and substantially parallel to the trough, said outer margin being laterally displaced outwardly from a position directly above the slot.

RAYMOND E. BEEGLE.

REFERENCES CITED

The following references are of record in the file of this patent:

UNITED STATES PATENTS

| Number | Name | Date |
| --- | --- | --- |
| 274,393 | Schaffert | Mar. 20, 1883 |
| 510,515 | McKenney | Dec. 12, 1893 |
| 531,989 | Andrews | Jan. 1, 1895 |
| 538,108 | Freeze | Apr. 23, 1895 |
| 603,611 | Nye | May 3, 1898 |
| 2,120,395 | Dean | June 14, 1938 |
| 2,457,128 | Churnell | Dec. 28, 1948 |

FOREIGN PATENTS

| Number | Country | Date |
| --- | --- | --- |
| 58,737 | France | 1863 |